Aug. 8, 1950     C. E. SUTTER     2,518,093
LAWN MOWER
Filed Feb. 23, 1946     2 Sheets-Sheet 1
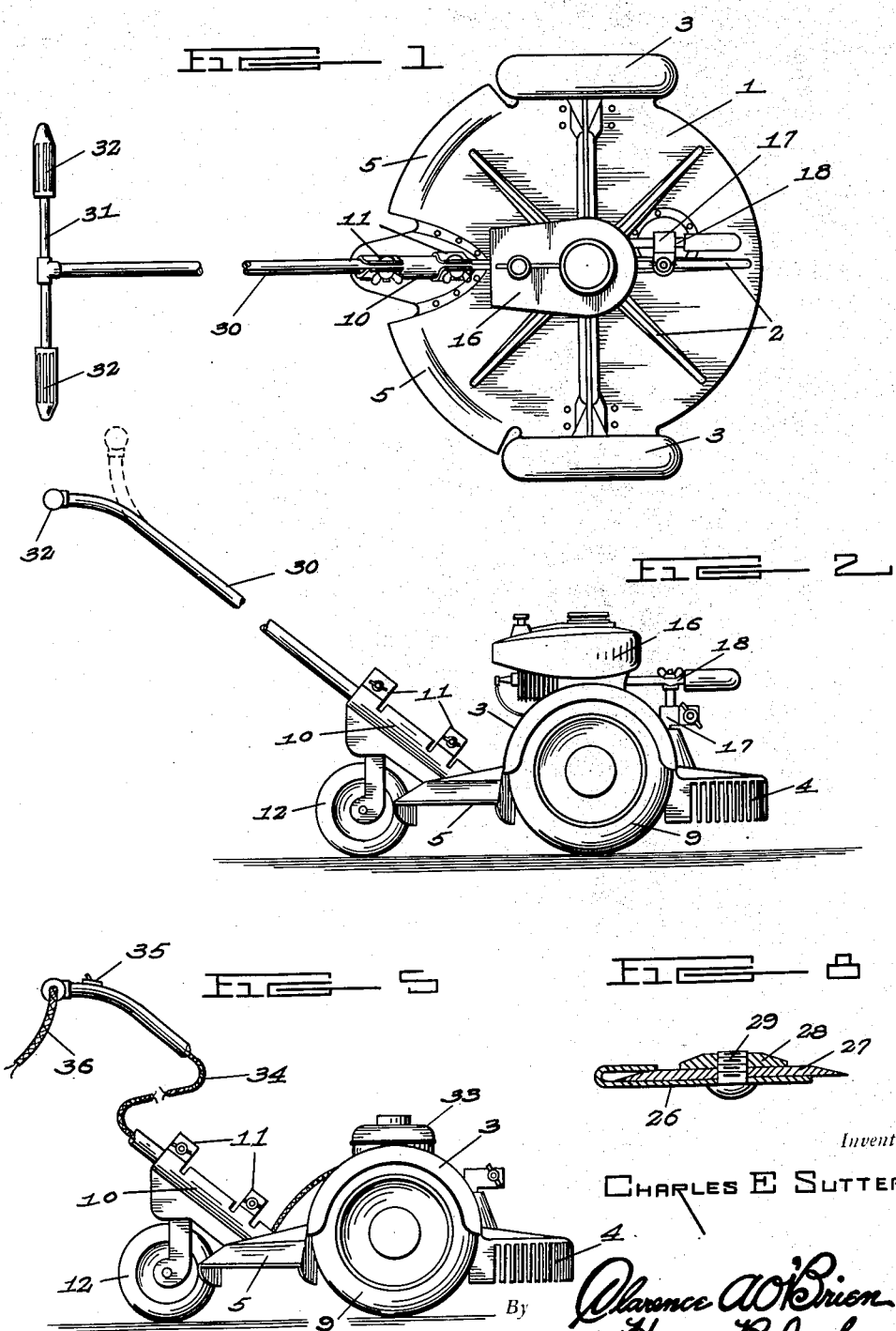
Inventor
CHARLES E SUTTER
By Clarence A O'Brien
and Harvey B. Jacobson
Attorneys Aug. 8, 1950     C. E. SUTTER     2,518,093
LAWN MOWER
Filed Feb. 23, 1946     2 Sheets-Sheet 2
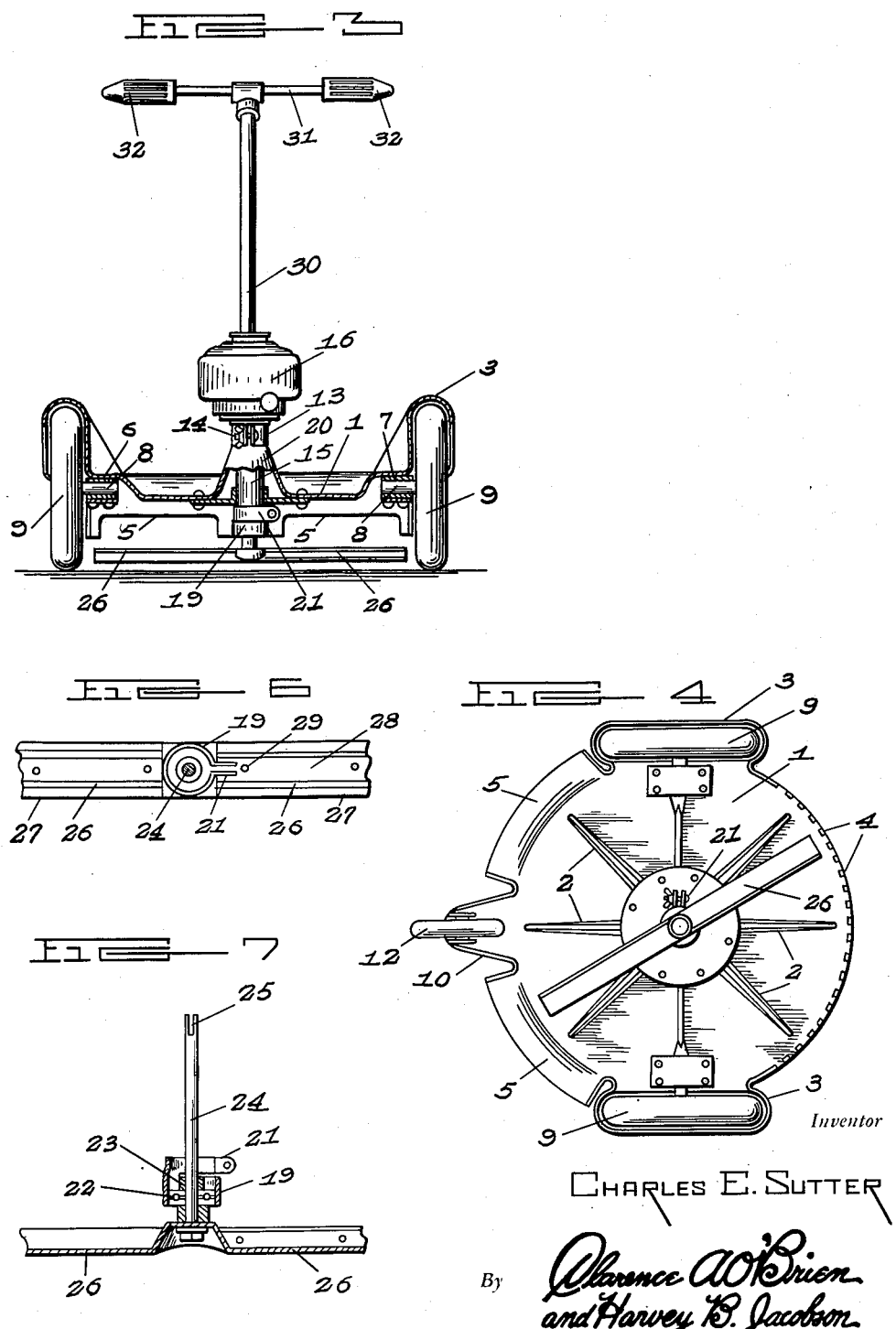
Inventor
CHARLES E. SUTTER
By Clarence A. O'Brien
and Harvey B. Jacobson
Attorneys Patented Aug. 8, 1950

2,518,093

UNITED STATES PATENT OFFICE 2,518,093

LAWN MOWER

Charles E. Sutter, Chesaning, Mich.

Application February 23, 1946, Serial No. 649,464

1 Claim. (Cl. 56—25.4)

This invention relates to improvements in lawn mowers, and more particularly to a manually propelled power operated cutter blade type lawn mower.

An object of the invention is to provide an improved lawn mower adapted to support a rotary cutter blade mounted on a vertical shaft and operated by either an outboard gasoline operated motor or an electric motor.

Another object of the invention is to provide an improved three wheel supported lawn mower having means for variably adjusting a rotary cutter blade, and means for interchangeably supporting an outboard motor or an electric motor for operating said blade.

A further object of the invention is to provide an improved lawn mower having an integrally formed body and wheel guards, and also a front and rear guard formed as a part of said body, and means comprising either an electric motor or an outboard motor for driving the rotary vertically mounted cutter blades.

A still further object of the invention is to provide an improved lawn mower having a vertically mounted cutter blade operated by an outboard motor or any vertical mounted gasoline motor using the same hook-up, which will be highly efficient in operation and relatively inexpensive to manufacture and produce.

Other objects will appear as the description proceeds.

In the accompanying drawings which form a part of this application:

Figure 1 is a top plan view of the improved lawn mower operated by an outboard motor;

Figure 2 is a side elevation of the lawn mower;

Figure 3 is a front elevation of the lawn mower;

Figure 4 is a bottom plan view of the lawn mower;

Figure 5 is a side elevation of the lawn mower equipped with an electric motor for operating the cutter blades;

Figure 6 is a plan view of the cutter blades and support therefor;

Figure 7 is a sectional view through the cutter blade support and its shaft and bearing;

Figure 8 is a transverse section through the cutter blade and its holder.

Like characters of reference are used throughout the following specification and the accompanying drawings to designate corresponding parts.

In carrying out the invention, there is provided a substantially round body 1 having radially extending ribs 2 formed therein for reinforcement, and upwardly extending oppositely disposed wheel guards or fenders 3, together with a depending slotted annular front guard or rake 4, and spaced laterally disposed rearwardly extending grass discharging hoods 5.

Oppositely disposed bearings 6 and 7 are secured to the undersurface of the body 1, and support the stub shafts 8 upon which the rubber tired wheels 9 are mounted.

A bracket 10 is formed on the rear of the body 1 and extends upwardly therefrom, and is formed with the spaced handle clamps 11 and a socket in the lower side of the bracket for receiving and supporting the small rubber tired caster wheel 12.

A centrally disposed bearing bracket 20 for the motor support is secured to the upper surface of the body 1, and is formed with a clamp 13 having a wing nut 14 for securing the lower end of the propeller shaft housing 15 of the outboard motor 16 in place. A second vertically adjustable bracket 17 is secured to the upper surface of the body 1 forwardly of the bracket 20 and is adapted to support and clamp the tiller handle 18 to further support the outboard motor in place.

The clamping housing 19 is provided with the clamp 21 which is adapted to be secured to the lower end of the propeller shaft, and supports a bearing 22 and an upper thrust bearing 23, through which the cutter blade supporting shaft 24 is mounted. A slot 25 is formed in the upper end of the shaft 24 and is retained in the lower end of the propeller shaft.

Oppositely disposed blade supporting clamps 26 are secured to the lower end of the shaft 24 and clamp the double edge blades 27 in position by means of the clamp plates 28 and screws 29.

A handle 30 is clamped in the bracket 10 and is slightly off-set at its outer end and provided with the cross handle 31 on which the hand grips 32 are positioned. The outer end of the handle may be tilted upwardly or downwardly as shown in Figure 2 of the drawings.

In Figure 9 of the drawings there is illustrated an electric motor 33 mounted upon the body of the mower in the same manner as the outboard motor is mounted. An electric conduit or conductor 34 extends from the motor 33 through the handle 30 to a control switch 35 adjacent the cross bar of the handle. An electric conduit or conductor 36 will extend through the end of the cross bar of the handle to a source of electric current supply (not shown).

The height of the cutters may be adjusted to cut low or high grass and even weeds by raising or lowering motor 16 and shaft 24 by releasing clamps 13 and 17 and later retightening same, and the forwardly disposed rake will effectively keep sticks and stones from reaching the rapidly rotating cutter blades.

While the preferred embodiment of the invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A mowing machine comprising a sheet metal body including integral wheel fenders formed at the sides thereof, an integral slotted rake formed on the front of said body, and integral rearwardly extending grass directing hoods formed at the rear of said body, wheels supported by said body beneath said fenders, a bracket mounted centrally on said body, an outboard motor mounted in said bracket, said motor including a shaft extending through said body, rotary cutter blades secured to said shaft disposed beneath said body and between said wheels, and a handle secured at the rear of said body for moving the machine.

CHARLES E. SUTTER.

REFERENCES CITED

The following references are of record in the file of this patent:

UNITED STATES PATENTS

| Number | Name | Date |
|---|---|---|
| 1,831,681 | Miller | Nov. 10, 1931 |
| 1,880,154 | Rotondo et al. | Sept. 27, 1932 |
| 2,083,103 | Steiner | June 8, 1937 |
| 2,165,551 | Iverson | July 11, 1939 |
| 2,198,526 | Cockburn | Apr. 23, 1940 |
| 2,259,676 | Winchell | Oct. 21, 1941 |
| 2,329,372 | Hitch | Sept. 14, 1943 |